United States Patent Office 3,020,106
Patented Feb. 6, 1962

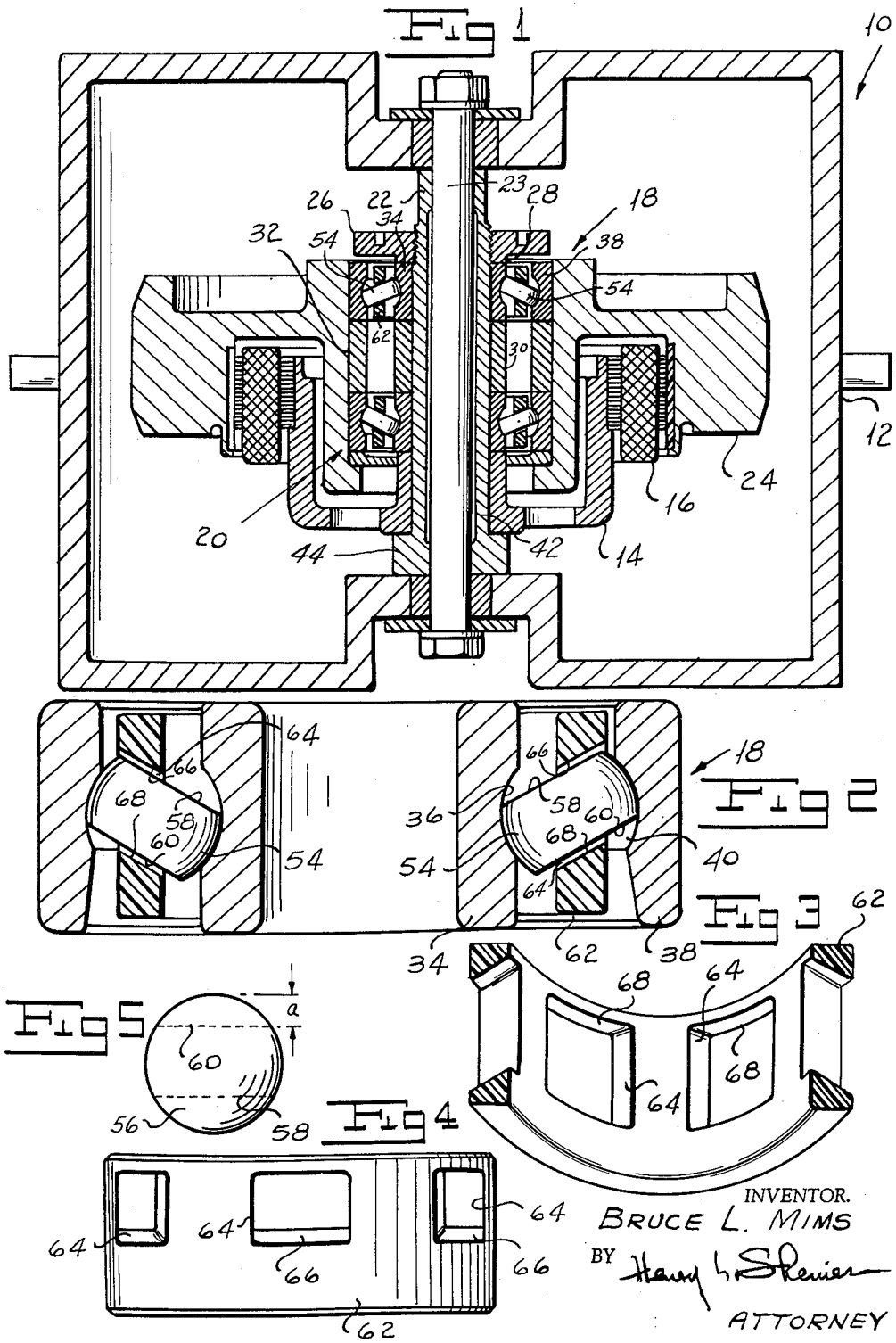

3,020,106
BEARINGS HAVING BALLS WITH
RESTRAINED SPIN AXES
Bruce L. Mims, Danbury, Conn., assignor to The Barden Corporation, Danbury, Conn., a corporation of Connecticut
Filed July 16, 1959, Ser. No. 827,575
3 Claims. (Cl. 308—174)

My invention relates to a bearing for use with a high performance gyroscope and more particularly to a bearing having balls with restrained spin axes.

In the art of high performance gyroscopes, even very small drifts are highly undesirable. Gyroscope drift may result from a shift of the gyroscope rotor along its spin axis. It is, therefore, desirable that the bearings which support a gyroscope rotor minimize any shift of the rotor along its axis.

Gyroscope rotors are supported in pairs of bearings which are preloaded to prevent end play. As a result of this preloading, the balls have spin axes which make an acute angle with the rotor shaft axis. The best ball which can be produced by the most modern manufacturing techniques is out-of-round by up to five millionths of an inch. If a random change in a bearing ball spin axis occurs, the out-of-roundness of the ball produces an axial shift of the rotor supported by the bearing through a distance which is a significant part of five millionths of an inch. In a gyroscope having a 1000 gram rotor and a moment of inertia of ten million gm.-cm.$^2$/sec., the rotor shift allowable for a drift rate of 0.001° per hour is about 0.02 millionths of an inch. The rotor shift resulting from a change in ball spin axes is therefore incompatible with the gyroscope performance often required.

A possible solution to the problem of preventing gyroscope rotor shift owing to out-of-roundness of its bearing rolling elements is the use of tapered roller bearings. This solution has not, however, proved to be satisfactory. Tapered rollers cannot be manufactured with the accuracy which is possible in the manufacture of balls. Moreover, when tapered roller bearings are loaded, as is required in a high performance gyroscope, a component of the load acts in a direction to force the rollers out of the bearing along their spin axes. This component of load must be resisted by a flange, formed in either the inner or the outer bearing ring, with which the end of the roller has frictional engagement. Clearly this frictional engagement of the roller end with a retaining flange produces undesirably high torque. For these reasons roller bearings have not proved satisfactory for use in high performance gyroscope rotor assemblies.

I have invented a bearing having rolling elements with restrained spin axes. My bearing prevents axial shifting of a gyroscope rotor supported in the bearing. My bearing accomplishes this result while having a torque which is comparable to that of an ordinary preloaded ball bearing. My bearing can be as accurately constructed as a conventional ball bearing, but without the ambiguity of spin axes inherent in the conventional ball bearing.

One object of my invention is to provide a bearing having rolling elements with restrained spin axes for use with a gyroscope rotor to prevent axial shifting of the rotor.

Another object of my invention is to provide a bearing having rolling elements with restrained spin axes which may be made as accurately as a conventional ball bearing without the ambiguity of spin axes present in the conventional ball bearing.

Other and further objects of my invention will appear from the following description.

In general my invention contemplates the provision of a preloaded gyroscope-rotor bearing having rolling elements, each of which is reduced in the direction of a diameter which is perpendicular to the load line of the ball to provide the ball with a pair of flat surfaces. My bearing includes a retainer having ball pockets or openings which are formed with flat surfaces which cooperate with the flat ball surfaces to constrain the rolling element to a single axis of rotation or to a set of spin axes describing a cone of small angle. When used to support a high performance gyroscope rotor, my bearings prevent axial shift of the gyroscope rotor to avoid the introduction of undesirable drift.

In the accompanying drawings, which form part of the instant specification and which are to be read in conjunction therewith and in which like reference characters are used to indicate like parts in the various views:

FIGURE 1 is a sectional view of a gyroscope rotor assembly employing my bearing having rolling elements with restrained spin axes.

FIGURE 2 is a sectional view of my bearing having rolling elements with restrained spin axes.

FIGURE 3 is a sectional perspective view of the retainer of my bearing having rolling elements with restrained spin axes.

FIGURE 4 is an elevation of the retainer of my bearing having rolling elements with restrained spin axes.

FIGURE 5 is a plan view showing the formation of a rolling element of a bearing having rolling elements with restrained spin axes.

Referring now more particularly to FIGURE 1 of the drawings, a gyroscope rotor assembly indicated generally by the reference character 10 includes a housing 12 to which I secure a stator support 14 by any convenient means, such as welding or the like. Stator support 14 carries windings 16, which are energized from any suitable source of electrical energy (not shown). Respective bearings, indicated generally by the reference characters 18 and 20, carried by a supporting quill 22 secured to housing 12, rotatably support the rotor 24. Rotor assembly 10 may be of the floated type known to the art.

In the assembly 10, shown in FIGURE 1 of the drawing, each of the bearings 18 and 20 is one of my bearings having rolling elements with restrained spin axes. I have shown the bearing 18 in detail in FIGURE 2. Bearing 18 includes an inner ring 34 formed with a race 36 and an outer ring 38 formed with a race 40. As is shown in FIGURE 1, the inner ring 34 is disposed on the central portion 42 of quill 22. Quill 22 has a boss 44 against which the assembly of bearings 18 and 20 bears. In order to load bearing 18, I thread a nut 26 adapted to receive a spanner wrench on the quill 22. Nut 26 has a boss 28 which engages the inner ring of bearing 18 to load the bearings. Conveniently I employ precision spacers 30 and 32 to assure establishment of the specified preload.

Referring now to FIGURES 2 and 5, bearing 18 includes a plurality of rolling elements 54. Each element 54 is formed from a ball 56, such as shown in FIGURE 5 by reducing the ball 56 along a diameter through a distance "a" to provide a pair of flat surfaces 58 and 60 on each rolling element. Each ball 56 is reduced along a diameter which coincides with the spin axis of the rolling element 54 when it is assembled in a bearing.

Bearing 18 includes a retainer 62 formed from any suitable plastic material. Retainer 62 has a plurality of rolling element receiving openings or pockets 64 formed with flat surfaces 66 and 68, which are substantially perpendicular to the spin axis of the rolling element received by the pocket. In the event that a rolling element 54, disposed in a pocket 64, is formed from a ball 56 which is out-of-round, the rolling element 54 tends to shift its spin axis as it rolls. The surfaces 66 and 68 of the retainer 62 cooperate with the flat surfaces 58 and 60 of the rolling element to constrain the element to a single spin axis or at worst to spin axes each of which lies in the surface of a cone having a small angle. This action prevents the rolling element spin axes from shifting appreciably to cause an undesirable axial shift of the gyroscope rotor supported in the bearing.

In the manufacture of my bearing having rolling elements with restrained spin axes, I reduce balls, such as the ball 56, along diameters which coincide with the spin axes of the rolling elements 54 when they are assembled in a bearing to form rolling elements 54 having flat surfaces 58 and 60. I form the retaining ring 62 with a number of pockets 64 having flat surfaces 66 and 68, which are substantially perpendicular to the spin axes of the rolling elements to be disposed in the pockets. I next assemble the bearing by placing rolling elements 54 in the pockets 64 with the element surfaces 58 and 60 adjacent to the pocket surfaces 66 and 68.

In use of my bearing having rolling elements with restrained spin axes to support a gyroscope rotor or the like, I place the inner rings of a pair of bearings 18 and 20 on the quill 22. The outer rings of the bearings 18 and 20 support rotor 24. Nut 26 loads the bearings to a degree determined by the spacers 30 and 32 to reduce rotor end play. The surfaces 66 and 68 of each bearing pocket cooperate with the rolling element surfaces 58 and 60 to constrain each of the rolling elements to spin about a single axis or at worst a set of axes describing a cone of a very small angle.

Thus any out-of-roundness of the balls 56, from which the rolling elements 54 are formed, cannot cause any appreciable axial shift of the rotor which would result in an undesirable drift of the gyroscope.

It will be seen that I have accomplished the objects of my invention. I have provided a bearing having rolling elements with restrained spin axes which is adapted for use in a high performance gyroscope rotor mounting. My bearing prevents axial shift of the gyroscope rotor owing to out-of-roundness of the balls. Thus my bearing prevents the occurrence of undesirable drift in the gyroscope. My bearing accomplishes this result while providing a substantially uniform torque comparable to that of ball bearings of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A preloaded bearing assembly including in combination a support, a stator carried by said support, a rotor having an axis of rotation, means including respective first and second bearings for rotatably mounting said rotor on said support, each of said bearings having respective races of arcuate cross-section and having rolling elements disposed between said races, said rolling elements having spin axes, means for urging corresponding first races of said bearings to move toward each other and relative to the second races of said bearings in the direction of said axis to load said bearings to cant the spin axes of the rolling elements of one of the bearings to an acute angle in one direction with respect to the rotor axis and to cant the spin axes of the rolling elements of the other bearing to an acute angle in the opposite direction with respect to said rotor axis and means for constraining each of the rolling elements to rotate about the spin axis to which it is canted under the action of said loading means.

2. A preloaded bearing assembly including in combination a support, a stator carried by said support, a rotor having an axis of rotation, means comprising first and second bearings for rotatably mounting said rotor on said support, each of said bearings having an inner race and an outer race and a plurality of ball segments disposed between said races, said ball segments having spin axes, each of said ball segments being provided with a flat surface, means for urging corresponding races of said bearings to move toward each other relative to the other races of the bearings in the direction of said axis to load said bearings and to incline the spin axes of the rolling elements of the first bearing to an acute angle in one direction with reference to the rotor axis and to incline the spin axes of the rolling elements of the other bearing to an acute angle in the opposite direction with respect to the rotor axis, the spin axis of each ball segment under the action of said rolling means being substantially perpendicular to the segment flat surface and respective retainers associated with said bearings, each retainer being provided with pockets for receiving the respective ball segments, each pocket providing a flat surface for cooperating with the corresponding ball segment flat surface to constrain each ball segment to rotate about the spin axis to which it is inclined under the action of said loading means.

3. A preloaded bearing assembly including in combination a support, a stator carried by said support, a rotor having an axis of rotation, means comprising first and second bearings for rotatably mounting said rotor on said support, each of said bearings having an inner race and an outer race and a plurality of ball segments disposed between said races, said segments having spin axes, each of said ball segments being reduced along a diameter to provide a pair of flat surfaces, means for urging corresponding races of said bearings to move toward each other relative to the other races of the bearings in the direction of said axis to load said bearings and to incline the spin axis of the segments of one of said bearings to an acute angle in one direction with reference to the rotor axis and to incline the spin axes of the segments of the other bearing to an acute angle in the other direction with respect to the rotor axis, the spin axis of each ball segment being substantially perpendicular to the segment surfaces and respective retainers for the segments of said bearings, each retainer being provided with pockets for receiving the respective ball segments, each pocket providing flat surfaces for cooperating with said segment flat surfaces to constrain each segment to rotate about the spin axis to which it is inclined under the action of said loading means.

References Cited in the file of this patent

UNITED STATES PATENTS

| | | |
|---|---|---|
| 351,001 | Starley | Oct. 19, 1886 |
| 663,435 | Heath | Dec. 11, 1900 |
| 1,426,353 | Brush | Aug. 22, 1922 |
| 1,757,953 | Chase | May 13, 1930 |
| 1,946,439 | Heller | Feb. 6, 1934 |
| 2,037,982 | Hughes | Apr. 21, 1936 |
| 2,401,557 | Dodge | June 4, 1946 |
| 2,782,642 | Beach | Feb. 26, 1957 |
| 2,827,788 | Campbell | Mar. 25, 1958 |

FOREIGN PATENTS

| | | |
|---|---|---|
| 117,341 | Great Britain | July 18, 1918 |